United States Patent [19]

Downing

[11] 4,337,616
[45] Jul. 6, 1982

[54] FUEL AIR RATIO CONTROLLED FUEL SPLITTER

[75] Inventor: Noel L. Downing, Indianapolis, Ind.

[73] Assignee: General Motors Corporation, Detroit, Mich.

[21] Appl. No.: 140,141

[22] Filed: Apr. 14, 1980

[51] Int. Cl.³ .............................................. F02C 9/04
[52] U.S. Cl. .................................. 60/39.28 R; 60/742; 60/746
[58] Field of Search .................... 60/746, 742, 39.28 R

[56] References Cited

U.S. PATENT DOCUMENTS

| | | | |
|---|---|---|---|
| 2,781,638 | 2/1957 | Fletcher et al. | 60/746 |
| 2,881,827 | 4/1959 | Roche et al. | |
| 3,899,879 | 8/1975 | Downing . | |
| 4,015,426 | 4/1977 | Hobo et al. | |
| 4,027,473 | 6/1977 | Baker . | |
| 4,157,012 | 6/1979 | Dubell | 60/742 |
| 4,305,255 | 12/1981 | Davies et al. | 60/746 |

*Primary Examiner*—Robert E. Garrett
*Attorney, Agent, or Firm*—J. C. Evans

[57] ABSTRACT

A fuel distribution system for regulating split of fuel flow between a pilot nozzle system and a main nozzle system for a combustor includes a flow network for directing fuel from a main fuel metering valve into an unrestricted line to a small pilot nozzle orifice producing a fine fuel spray pattern at low fuel flow rates and further including a fuel splitter valve interposed between the outlet from the fuel metering valve and a fuel conduit connected to a main fuel nozzle of increased orifice size to atomize higher rates of fuel flow thereto and wherein the fuel splitter valve includes an electrically energizable component that receives a control signal of desired pilot fuel/air ratio generated by a controller in part utilizing a signal of total actual fuel flow and total actual air flow to produce the control signal to control operation of the splitter valve so as to regulate the amount of fuel flow to the main nozzle system in accordance with the control signal thereby to produce a residual flow of fuel to the pilot valve to maintain a prescheduled fuel/air ratio for the pilot nozzle system to improve combustor efficiency.

4 Claims, 4 Drawing Figures

U.S. Patent     Jul. 6, 1982     4,337,616
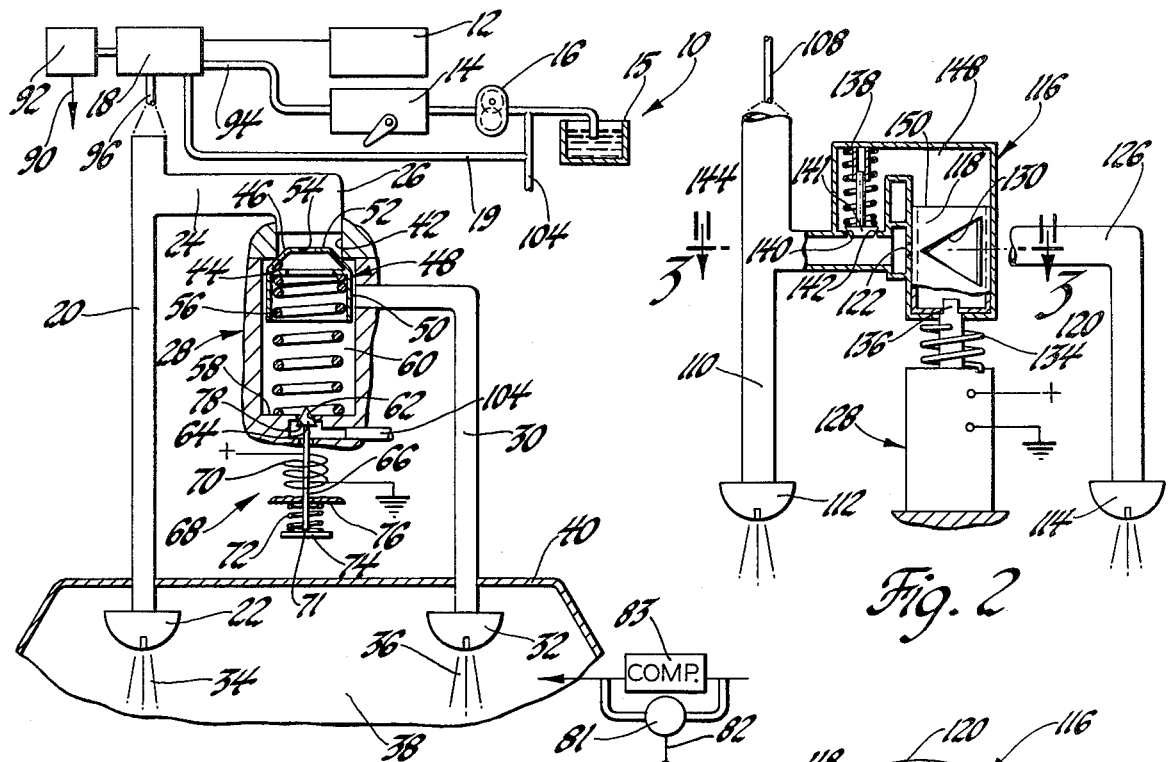
Fig. 1
Fig. 2
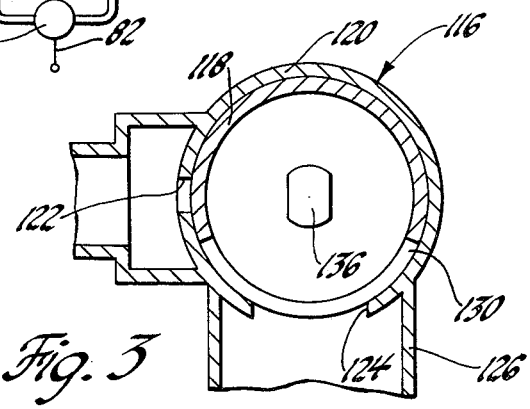
Fig. 3
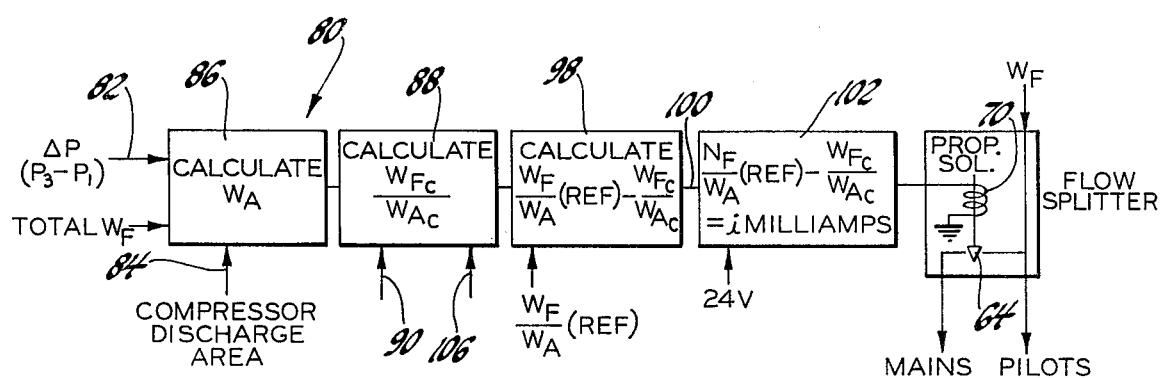
Fig. 4

FUEL AIR RATIO CONTROLLED FUEL SPLITTER

This invention relates to fuel controllers for regulating the proportion of fuel flow between a pilot nozle and main nozzle in a combustor of a gas turbine engine and, more particularly, to fuel controllers for maintaining a desired amount of fuel flow to the pilot nozzle to assure adequate fuel supply thereto during engine start-up and low fuel flow periods of operations so as to maintain combustor efficiency while preventing excessive richness of pilot fuel flow and while preventing excessive leanness of pilot fuel flow.

Various proposals have been suggested to split flow of fuel from a gas turbine engine fuel controller to supply pilot and main fuel nozzles in a combustor for gas turbine engines. Such systems, in the past, have relied upon a fuel flow split through the fuel distribution system wherein the fuel flow split is controlled primarily by pressure of the fuel at the inlet to the fuel distribution system and to the predetermined flow areas through flow distribution conduits. In order to maintain combustor efficiency it is desirable to maintain precise flow splits in the flow of total fuel flow to pilot nozzles and main nozzles of current gas turbine engine combustors. Such precise fuel splitting control preferably should prevent excessive pilot fuel richness and should prevent excessive pilot fuel leanness during combustor operation.

Accordingly, an object of the present invention is to provide an improved pilot fuel nozzle and main fuel nozzle flow distribution system including a pilot nozzle having a fine spray distribution orifice therefrom for assuring adequate combustion of air and fuel at reduced fuel flow conditions of operation and to include control means to establish an exact predetermined pilot air/fuel ratio to avoid pilot fuel richness or pilot fuel lean conditions of operation and wherein the control means includes provision of a fuel/air ratio controlled fuel splitter valve located within the fuel supply to a parallel distribution system into a pilot fuel nozzle and a main fuel nozzle of combustor and wherein the fuel/air ratio controlled fuel splitter valve includes means responsive in part to a pilot fuel/air ratio signal to regulate flow to a main fuel nozzle so as to produce a residual amount of fuel flow to a pilot fuel nozzle thereby to maintain a desired pilot fuel/air ratio to maintain combustor efficiency throughout a full fuel flow range of combustor operation.

Further objects and advantages of the present invention will be apparent from the following description, reference being had to the accompanying drawings wherein preferred embodiments of the present invention are clearly shown.

FIG. 1 is a diagrammatic view of a first embodiment of a fuel/air ratio controlled fuel splitter valve in accordance with the present invention;

FIG. 2 is a diagrammatic view of a second embodiment of a fuel/air ratio controlled fuel splitter valve in accordance with the present invention;

FIG. 3 is a cross-sectional view taken along the line 3—3 of FIG. 2; and

FIG. 4 is a diagrammatic block diagram of a control system used in association with the splitter valves of the present invention.

Referring now to FIG. 1, a fuel control system 10 is illustrated including an engine condition fuel controller 12 such as is set forth in U.S. Pat. No. 3,124,932, issued Mar. 17, 1964, to Nelson et al. for TURBINE AIR INLET TEMPERATURE FUEL CONTROL FOR A GAS TURBINE ENGINE, or, U.S. Pat. No. 3,482,396, issued Dec. 9, 1969, to Nelson et al. for ELECTRONIC FUEL CONTROL SYSTEM, and a main control 14 to regulate the flow of fuel from a fuel source 15 and an engine driven fuel pump 16.

Main control 14 is of the type set forth more specifically in U.S. Pat. No. 3,121,456, issued Feb. 18, 1964. Fuel from fuel pump 16 is directed to a main fuel metering valve 18. A pump bypass 19 from valve 18 returns excessive fuel to the inlet of pump 16. Valve 18 has a relatively unrestricted pilot nozzle fuel conduit 20 in turn connected to a diagrammatically illustrated pilot fuel nozzle 22 more particularly of the type having a reduced area orifice 23 to produce a fine fuel spray pattern therefrom.

Additionally, the control system 10 includes a branch conduit 24 connected to the inlet 26 of a fuel/air ratio controlled fuel splitter valve 28 constructed and operated in accordance with the present invention to vary the amount of fuel flow to a main fuel nozzle conduit 30 connected to a main fuel nozzle 32 for supplying a desired atomization of higher volumes of fuel flow to a gas turbine engine combustor. The pilot fuel nozzle 22 and main fuel nozzle 32 are shown diagrammatically, it being understood that multiple members of nozzles can be included in pilot fuel nozzle systems and main fuel nozzle systems. Alternatively, the pilot fuel nozzle and main fuel nozzle can be included in a single structure including both pilot nozzle and main nozzle outlets. An example of this kind of nozzle is shown in U.S. Pat. No. 3,713,588, issued Jan. 30, 1973, to Sharpe. In the illustrated arrangement, both the pilot fuel nozzle 22 and main fuel nozzle 32 are shown as directing spray cones of fuel 34 and 36 into a reaction zone 38 formed downstream of the dome 40 of combustion apparatus.

An example of such a combustor apparatus is set forth in U.S. Pat. No. 3,780,529, issued Dec. 25, 1973, to Johnson, with it being understood that such a combustion apparatus has a predetermined quantity of air flow directed thereto from the outlet of a compressor of a gas turbine engine to supply total air flow requirements of the combustor for combustion therein with fuel supplied thereto for producing desired amounts of thrust by the gas turbine engine.

Referring now more specifically to the fuel splitter valve 28, it includes a port 42 downstream of the inlet 26. An annular valve seat 44 is formed around the port 42 to define a controlled flow area through the port 42 that has flow therethrough regulated by an annular conical tapered surface 46 on a poppet valve 48. The poppet valve 48 more particularly includes a cage 50 that is formed as an annular skirt dependent from a cover 52 having a control orifice 54 formed therethrough. The cage 50 supports one end of a compression control spring 56 having the opposite end thereof seated on a valve housing abutment surface 58. The cover 52 separates the inlet 26 of the fuel splitter valve 28 from a control chamber 60 of the valve 28. A bleed opening 62 is formed in the abutment surface 58 for regulating the amount of pressure in the control chamber 60. It is under the control of a valve element 64 having a stem 66 thereon which constitutes the armature of a proportional solenoid 68 having a coil 70 wrapped around the stem forming armature of the proportional solenoid 68. The stem 66 has an extension 71 surrounded by a regulation spring 72 with one of its ends carried by a base 74 on the stem 66. The other end of spring 72 is grounded at one end to a reference surface diagrammatically shown at 76 to direct an opening force on the stem 66 in opposition to the electromagnetic force of the coil 70 of the proportional solenoid on the stem 66 so as to move the valve element 64 into flow controlling relationship with respect to a bleed valve seat 78 formed in surrounding relationship to the bleed opening 62 from the control chamber 60.

The operation of the FIG. 1 embodiment of the invention utilizes a current signal established by controller logic 80 of the type shown in FIG. 4. A pressure differential sensor/transducer 81 across the air supply compressor 83 for supplying the combustion air is converted into a $\Delta P$ signal of $(P_3-P_1)$ at line 82. The $\Delta P$ signal is utilized with a signal 84 of compressor discharge area to calculate total air flow $W_A$ to the combustor at logic block 86, representative of a suitably programmed digital computer for calculating the expression $Q = A\sqrt{K\Delta P}$ wherein Q is the total air flow $W_A$; A is the compressor discharge area as represented by the signal on the line 84 and $\Delta P$ is the $\Delta P$ signal represented by the signal on the line 82 and K is a flow constant. A calculated $W_A$ signal is directed to a second logic block 88 in which a signal of total fuel flow $W_F$ from signal line 90 is divided by $W_A$ to produce a ratio signal $W_F/W_A$. The measurement of $W_F$ or total fuel can be established by means of a rotary variable differential transformer 92 coupled to the main metering valve 18 and operative to produce a signal reflective of the fuel flow area through the metering valve from its inlet 94 to its outlet 96. Metering valve 18 has a pressure differential therebetween that is maintained relatively constant during engine operation and hence the area signal represents $W_F$. A signal representing the ratio of actual fuel $W_F$ to actual air supply $W_A$ is directed to a logic block 98 in which circuit means of a digital controller is preset to subtract the ratio of total fuel to total air from the desired schedule of a referenced fuel supply to air supply to a pilot fuel nozzle so as to optimize combustor efficiency. The difference between the actual ratio of total $W_F/W_A$ and the desired schedule ratio $W_F/W_A$ (reference) will produce an output signal on line 100 that is in millivolts. The logic block 102 includes a 24 volt reference and means for converting the voltage signal from block 98 to milliamps through the coil 70 to proportionally control the position of the valve element 64 in the embodiment of the invention shown in FIG. 1. Alternatively, where there is no difference between the scheduled fuel/air reference ratio and the actual fuel/air ratio, there will be no throughput signal and there will be no output from the logic box 102 so that the valve will be moved to a position to produce full opening of the bleed opening 62.

More particularly, during low fuel flows when it is desirable to maintain a preselected desired pilot nozzle fuel/air ratio for maintaining combustor efficiency, fuel that enters the fuel valve 28 from the main fuel metering valve 18 will produce an output from the logic block 98 as a signal schedule as represented in the following listed typical millivolt schedule.

| MILLIVOLT SCHEDULE (TYPICAL) $W_F/W_A$ VOLTAGE | | |
|---|---|---|
| REFERENCE | CALCULATED | v-Volts |
| 10 | 0 | 10 |
| 10 | 2 | 8 |

| MILLIVOLT SCHEDULE (TYPICAL) $W_F/W_A$ VOLTAGE -continued | | |
|---|---|---|
| REFERENCE | CALCULATED | v-Volts |
| 10 | 4 | 6 |
| 10 | 6 | 4 |
| 10 | 8 | 2 |
| 10 | 10 | 0 |

Thus, as a fuel metering valve initially opens, a feedback signal will be produced by the rotary variable differential transformer 92 representing the total actual fuel signal $W_F$ at line 90 into the logic system of FIG. 4 at block 88. A resultant signal from the system, in milliamps, is directed through line 100 to condition the solenoid coil 70 to withdraw the valve element 64 from the bleed opening 62. This will cause pressure to bleed from the control chamber 60 and will produce a resultant increase in the boost pressure through a conduit 104 to the inlet of the fuel pump 16. Prior to this point, the poppet valve 48 is maintained closed due to equal pressures that are maintained thereon on both sides of the poppet valve cover 52 through the control orifice 54. However, as soon as pressure is bled from the control chamber 60, an imbalance of pressures will occur on the poppet valve 48 and the force of the compression control spring 56 is overcome to move the poppet valve 48 from the valve seat 44. The flow area of the resultant annular opening between seat 42 and valve surface 46 will be proportional to the magnitude of the milliamp signal i.

In this embodiment of the invention, a further compensation or error signal can be imposed on an input line 106 to modify the function of the logic block 88. In this case, by measuring the pressure at the outlet 96 of the metering valve 18 and the pressure in the conduit 104 and knowing the constant area of orifice 54 and the area of the orifice defined between valve 64 and valve seat 78 at the bleed outlet opening 62 an error signal can be combined with the input signal of $W_A/W_F$ actual so that the control ratio will contain both total combustor flow (fuel and air) and compensation for the bleed fuel flow error by slightly modifying the aforesaid reference schedule in millivolts.

The pressure in chamber 60 and resultant controlled opening of the poppet valve 48 will be in accordance with the corrected signal. This will regulate fuel flow to the main nozzle to produce a residual fuel flow through the pilot nozzle fuel conduit 20 to produce a desired fuel/air ratio at the pilot nozzle to prevent either a rich or lean fuel condition at the pilot nozzle. Accordingly, combustor efficiency and heat recovery of the combustion apparatus is optimized. In other words, fuel flow to the main nozzle 32 when subtracted from the total main metering valve fuel flow, (adjusted for bleed valve flow error), leaves sufficient fuel flow through the pilot system to meet the required pilot fuel/air ratio of the pilot system.

In the illustrated arrangement a pilot can overcontrol the system by disconnecting the output at line 100 from the coil 70. In this case, the proportional solenoid coil current flow is reduced to zero. As a result the control or regulating spring 72 will place the valve element 64 in an open position. Accordingly, proper selection of the rate of the compression control spring 56 will allow the poppet valve 48 to remain open at a prescribed pressure drop thereacross without maintaining a desired pilot fuel/air ratio; nevertheless metered fuel flow from valve 18 continues to maintain engine thrust as fuel to nozzles 22, 32 is established only by system flow areas. The energization of the proportional solenoid coil 70 otherwise proceeds in accordance with a schedule as listed. As the WF/WA calculated signal increases, the voltage v decreases and the valve element will be pulled a greater amount from the bleed outlet opening 62 until the orifice flow represented by the fuel flow through the bleed outlet opening 62 is finally at a maximum area. At this point, the pilot nozzle and main nozzles are flowing equally to uniformly distribute fuel through the reaction zone of the combustion apparatus.

Referring now to the embodiment of the invention shown in FIGS. 2 and 3, a fuel supply system is illustrated which receives fuel from a conduit 108 from the outlet of a metering valve like valve 18 in FIG. 1. The conduit 108 supplies a pilot nozzle conduit 110 connected to a pilot nozzle 112 corresponding to the pilot nozzle 22 in the first embodiment. Fuel flow in conduit 108 is split between the pilot fuel nozzle 112 and a main fuel nozzle 114 through a motor driven pilot fuel/air ratio controlled splitter 116. Splitter 116 has a rotary sleeve valve 118 located for rotation within a generally cylindrical housing 120 having an inlet port 122 therein and an outlet port 124 that communicates with a supply conduit 126 connected to the main fuel nozzle 114. A gear type electrically energizable motor 128 rotates the sleeve valve 118 to overlap a contoured or tapered slot 130 therein with inlet port 122 to control fuel flow through the main nozzle 114. The energization of the gear type motor 128 is established by a control signal which is represented by the logic control of FIG. 4 absent the error signal as produced by the bypass flow through the conduit 104. Thus, the contoured slot 130 will be positioned with respect to the inlet port 122 so as to maintain a controlled amount of metered fuel flow through the pilot nozzle to establish a prescheduled desired pilot fuel-to-pilot air ratio so as to maintain combustor efficiency during low fuel flow conditions of operation of the combustion apparatus. If electrical power to the motor is lost, a return spring 134 about the shaft 136 from the gear type motor 128 will rotate the metering valve sleeve 118 to a zero metering area. At this point, a bypass poppet valve 141 closed against a valve seat 140 around a bypass orifice 142 in the inlet pipe 144 to the inlet port 122 of the splitter valve 116 will open against the force of the poppet spring 138 and the bypass fuel will flow through the contoured port 130, then located in overlying relationship with the outlet port 124. Port 130 is open to bypass passage 148 to an upper open end 150 of the sleeve valve 118 so that fuel will flow to the main nozzle without control of pilot nozzle fuel flow. The system however, supplies fuel to maintain engine thrust.

While the embodiments of the present invention, as herein disclosed, constitute a preferred form, it is to be understood that other forms might be adopted.

The embodiments of the invention in which an exclusive property or privilege is claimed are defined as follows:

1. A fuel control system for establishing a desired scheduled pilot fuel/air ratio at the pilot nozzle supplying fuel to a gas turbine engine combustor comprising; a pilot fuel nozzle and a main fuel nozzle, fuel metering means for supplying total engine fuel requirements, conduit means for directing the total engine fuel requirements to said pilot nozzle and said main nozzle, said conduit means including an unrestricted conduit directly connected between said fuel metering means and said pilot nozzle to maintain fuel metering means outlet pressure on said pilot fuel nozzle, said pilot fuel nozzle having a small orifice outlet therefrom for mixing reduced quantities of fuel with inlet air to maintain a combustible fuel/air mixture, a branch conduit to said main nozzle, fuel splitter valve means for regulating fuel flow from said fuel metering means into said unrestricted conduit and said branch conduit, means establishing a control signal schedule corresponding to a desired, predetermined pilot fuel/air ratio required to maintain fuel flow from said pilot fuel nozzle to produce a fuel/air mixture therefrom to maintain combustor efficiency during reduced fuel flow rates from said fuel metering means, said fuel splitter valve means including means responsive to said control signal to throttle fuel flow from said fuel metering means to said branch conduit so as to maintain a controlled residual fuel flow in said unrestricted conduit to maintain the scheduled pilot fuel/air ratio at low levels of fuel flow from said metering means thereby to prevent either pilot nozzle fuel richness or pilot nozzle fuel leanness that would otherwise reduce combustor efficiency.

2. A fuel control system for establishing a desired scheduled pilot fuel/air ratio at the pilot nozzle supplying fuel to a gas turbine engine combustor comprising; a pilot fuel nozzle and main fuel nozzle, fuel metering means for supplying total engine fuel requirements, conduit means for directing the total engine fuel requirements to said pilot nozzle and said main nozzle, said conduit means including an unrestricted conduit directly connected between said fuel metering means and said pilot nozzle to maintain fuel metering means outlet pressure on said pilot fuel nozzle, said pilot fuel nozzle having a small orifice outlet therefrom for mixing reduced quantities of fuel with inlet air to maintain a combustible fuel/air mixture, a branch conduit to said main nozzle, fuel splitter valve means for requiring fuel flow from said fuel metering means into said unrestricted conduit and said branch conduit, means establishing a control signal schedule corresponding to a desired, predetermined pilot fuel/air ratio required to maintain fuel flow from said pilot fuel nozzle to produce a fuel/air mixture therefrom to maintain combustor efficiency during reduced fuel flow rates from said fuel metering means, said fuel splitter valve means including controlled means responsive to said control signal to throttle fuel flow from said fuel metering means to said branch conduit so as to maintain a controlled residual fuel flow in said unrestricted conduit to maintain the scheduled pilot fuel/air ratio at low levels of fuel flow from said metering means thereby to prevent either pilot nozzle fuel richness or pilot nozzle fuel leanness that would otherwise reduce combustor efficiency, said fuel splitter controlled means being responsive to a zero control signal to condition said fuel splitter valve means to direct equal amounts of fuel to said pilot fuel nozzle and said main fuel nozzle thereby to equalize fuel distribution into the combustor.

3. A fuel control system for establishing a desired scheduled pilot fuel/air ratio at the pilot nozzle supplying fuel to a gas turbine engine combustor comprising: a pilot fuel nozzzle and a main fuel nozzle, fuel metering means for supplying total engine fuel requirements, conduit means for directing the total engine fuel requirements to a pilot nozzle and a main nozzle, said conduit means including an unrestricted conduit directly connected between said fuel metering means and said pilot nozzle to maintain fuel metering means outlet pressure on said pilot fuel nozzle, said pilot fuel nozzle having a small orifice outlet therefrom for mixing reduced quantities of fuel with inlet air to maintain a combustible fuel/air mixture, a branch conduit to said main nozzle, fuel splitter valve means for regulating fuel flow from said fuel metering means into said unrestricted conduit and said branch conduit, means establishing a control signal schedule corresponding to a desired, predetermined pilot fuel/air ratio required to maintain fuel flow from said pilot fuel nozzle to produce a fuel/air mixture therefrom to maintain combustor efficiency during reduced fuel flow rates from said fuel metering means, said fuel splitter valve means including solenoid valve means responsive to said control signal, means including a control poppet valve defining a control pressure chamber bled by said solenoid valve means to control said poppet valve to throttle fuel flow from said fuel metering means to said branch conduit so as to maintain a controlled residual fuel flow in said unrestricted conduit to maintain the scheduled pilot fuel/air ratio at low levels of fuel flow from said metering means thereby to prevent either pilot nozzle fuel richness or pilot nozzle fuel leanness that would otherwise reduce combustor efficiency, said fuel splitter solenoid valve means being responsive to a zero control signal to condition said poppet valve means to direct equal amounts of fuel to said pilot fuel nozzle and said main fuel nozzle thereby to equalize fuel distribution into the combustor.

4. A fuel control system for establishing a desired scheduled pilot fuel/air ratio at the pilot nozzle supplying fuel to a gas turbine engine combustor comprising: a pilot fuel nozzle and a main fuel nozzle, fuel metering means for supplying total engine fuel requirements, conduit means for directing the total engine fuel requirements to said pilot nozzle and said main nozzle, said conduit means including an unrestricted conduit directly connected between said fuel metering means and said pilot nozzle to maintain fuel metering means outlet pressure on said pilot fuel nozzle, said pilot fuel nozzle having a small orifice outlet therefrom for mixing reduced quantities of fuel with inlet air to maintain a combustible fuel/air mixture, a branch conduit to said main nozle, fuel splitter valve means for regulating fuel flow from said fuel metering means into said unrestricted conduit and said branch conduit, means establishing a control signal schedule corresponding to a desired, predetermined pilot fuel/air ratio required to maintain fuel flow from said pilot fuel nozzle to produce a fuel/air mixture therefrom to maintain combustor efficiency during reduced fuel flow rates from said fuel metering means, said fuel splitter valve means including a sleeve valve and motor means responsive to said control signal to throttle fuel flow from said fuel metering means to said branch conduit so as to maintain a controlled residual fuel flow in said unrestricted conduit to maintain the scheduled pilot fuel/air ratio at low levels of fuel flow from said metering means thereby to prevent either pilot nozzle fuel richness or pilot nozzle fuel leanness that would otherwise reduce combustor efficiency, said motor means being responsive to a zero control signal to condition said sleeve valve means to direct equal amounts of fuel to said pilot fuel nozzle and said main fuel nozzle thereby to equalize fuel distribution into the combustor.

* * * * *